United States Patent
McClintock

(10) Patent No.: US 12,276,530 B2
(45) Date of Patent: Apr. 15, 2025

(54) PORTABLE VERIFICATION SYSTEM AND METHOD FOR USE IN LOWER PRESSURE COMMERCIAL AND RESIDENTIAL GAS FLOW METERS

(71) Applicant: Big Elk Energy Systems, LLC, Tulsa, OK (US)

(72) Inventor: Dennis McClintock, Tulsa, OK (US)

(73) Assignee: Big Elk Energy Systems, LLC, Tulsa, OK (US)

(*) Notice: Subject to any disclaimer, the term of this patent is extended or adjusted under 35 U.S.C. 154(b) by 222 days.

(21) Appl. No.: 17/740,185

(22) Filed: May 9, 2022

(65) Prior Publication Data
US 2023/0324204 A1 Oct. 12, 2023

Related U.S. Application Data

(60) Provisional application No. 63/328,066, filed on Apr. 6, 2022.

(51) Int. Cl.
*G01D 4/02* (2006.01)
*G01D 18/00* (2006.01)

(52) U.S. Cl.
CPC .......... *G01D 18/00* (2013.01); *G01D 4/02* (2013.01)

(58) Field of Classification Search
CPC .. G01D 18/00; G01D 4/02; G01F 1/00; G01F 25/13; G01F 25/15; G01F 15/005; G01F 15/001; G01F 1/667; G01F 15/063; G01F 15/18; G01F 25/10; G01L 7/00; G01L 9/00; G01M 99/005; G01M 3/205; G06Q 10/20; F04B 51/00; F04B 49/22; F04B 49/24;

(Continued)

(56) References Cited

U.S. PATENT DOCUMENTS

| | | | |
|---|---|---|---|
| 1,492,204 | A | 4/1924 | Clark |
| 3,446,055 | A | 5/1969 | Tuck et al. |
| 3,958,443 | A | 5/1976 | Berrettini |

(Continued)

FOREIGN PATENT DOCUMENTS

| | | | | |
|---|---|---|---|---|
| CN | 104482343 A | * | 4/2015 | ............. F16L 1/028 |
| GB | 402954 A | | 12/1933 | |

OTHER PUBLICATIONS

Tanisawa, S. & Hirose, H.. (2004). Study on a gas FM ultrasonic flow rate sensor for a small diameter pipe. Filtration & Separation—Filtr Sep. 521-524 vol. 1. (Year: 2004).*

(Continued)

*Primary Examiner* — Daniel R Miller
*Assistant Examiner* — Eric Sebastian Von Wald
(74) *Attorney, Agent, or Firm* — GableGotwals

(57) ABSTRACT

Embodiments of a portable verification system can move from one commercial building or residential home gas flow meter location to another and temporarily connect to the building's or home's natural gas piping. The portable verification system may be connected to the gas flow meter by a flexible hose having a lap joint flange at one end. Adaptor fittings can be used to provide additional versatility. When in an intended use, natural gas flows into the reference meter and then into the gas flow meter connected to the commercial building or residential home. Downtime is limited to the time required to complete a circuit between the gas flow meter and the portable verification system.

6 Claims, 2 Drawing Sheets

(58) Field of Classification Search
CPC ........ F17C 2265/068; F17D 1/04; F17D 3/01; F17D 3/18; F17D 5/02; F24D 19/1015
See application file for complete search history.

(56) References Cited

U.S. PATENT DOCUMENTS

| | | | |
|---|---|---|---|
| 4,106,328 | A | 8/1978 | Neeff |
| 4,646,575 | A | 3/1987 | O'Hair et al. |
| 4,658,634 | A | 4/1987 | Killough et al. |
| 4,821,557 | A | 4/1989 | Beeson, III |
| 5,060,514 | A | 10/1991 | Aylsworth |
| 5,207,088 | A | 5/1993 | Geery |
| 5,421,188 | A | 6/1995 | Sager |
| 5,895,863 | A | 4/1999 | Glaudel et al. |
| 6,471,249 | B1 | 10/2002 | Lewis |
| 6,629,447 | B1 | 10/2003 | Collins |
| 6,721,674 | B2 | 4/2004 | Borzsonji |
| 7,475,586 | B2 | 1/2009 | Swanek |
| 7,685,861 | B2 | 3/2010 | Lynch et al. |
| 7,942,068 | B2 | 5/2011 | Ao et al. |
| 8,302,455 | B2 | 11/2012 | Straub, Jr. |
| 8,816,866 | B2 | 8/2014 | Day |
| 9,010,196 | B2 | 4/2015 | Kurth et al. |
| 9,316,517 | B2 | 4/2016 | Forbes et al. |
| 9,714,852 | B2 * | 7/2017 | Moore ...................... G01F 1/00 |
| 2009/0205400 | A1 | 8/2009 | McPeak |
| 2013/0080080 | A1 | 3/2013 | Forbes et al. |
| 2013/0179374 | A1 | 7/2013 | Hains et al. |
| 2013/0340519 | A1 | 12/2013 | Kurth et al. |
| 2020/0072654 | A1 | 3/2020 | McClintock |
| 2021/0278262 | A1 * | 9/2021 | Loos ......................... G01F 1/66 |
| 2022/0049986 | A1 * | 2/2022 | Lampe-Jürgens ...... G01F 25/10 |
| 2022/0214203 | A1 * | 7/2022 | Shao ..................... G01F 15/063 |
| 2023/0228605 | A1 * | 7/2023 | Alsaiari ................ G01F 15/005 73/861.27 |

OTHER PUBLICATIONS

Bowles Jr., "In-situ (on-site) gas meter proving.", International School of Hydrocarbon Measurement—87th Annual International School of Hydrocarbon Measurement 2012, 2012, pp. 760-769, vol. 2, Publisher: www.measurementlibrary.com (accessed Jan. 9, 2018).
FMC Technologies, "Multipath Ultrasonic Gas Flow Meter; Flow Calibration Procedure; Procedure Manual", Oct. 2009.
Haner, "ultrasonic Flow Meter Calibration", , Publisher: TransCanada Calibrations; 2009.
Academic Press Dictionary of Science & Technology, "meter run definition".
Rudroff, "Onsite Proving of Gas Flow Meters", http://asgmt.com/wp-content/uploads/pdf-docs/2011/1/M30.pdf, 2011, Publisher: Welker Flow Measurement Systems Inc.

* cited by examiner

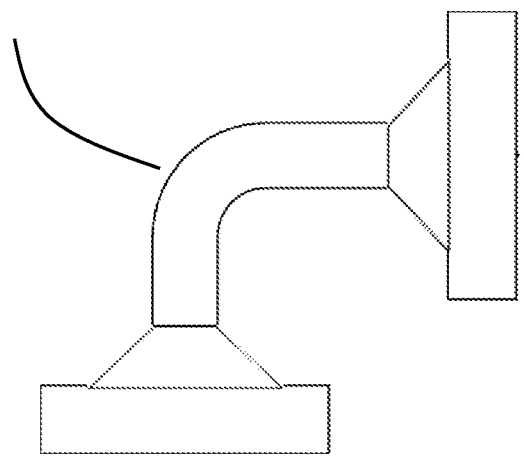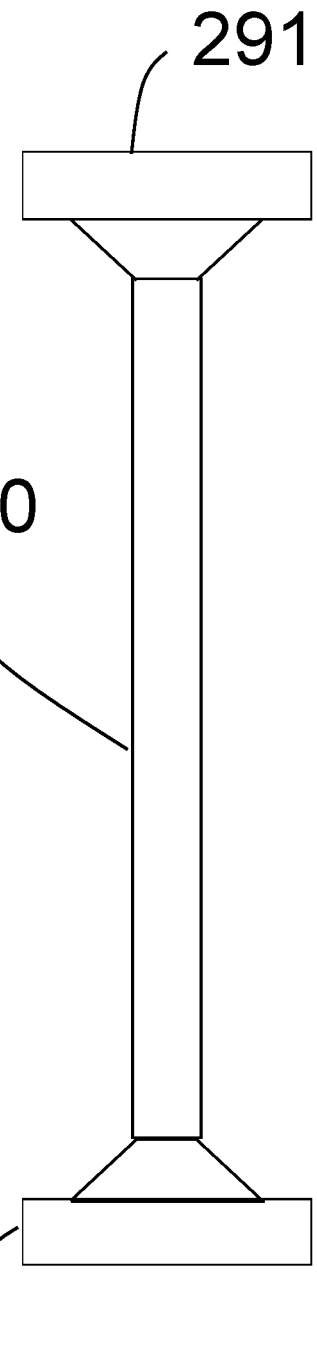

PORTABLE VERIFICATION SYSTEM AND METHOD FOR USE IN LOWER PRESSURE COMMERCIAL AND RESIDENTIAL GAS FLOW METERS

CROSS-REFERENCE TO CO-PENDING APPLICATIONS

This application claims priority to U.S. 63/328,066, filed Apr. 4, 2022

BACKGROUND

This disclosure relates to gas flow measurement equipment and, in particular, to equipment, systems, and methods designed to improve the accuracy of gas flow measurement lower pressure commercial and residential gas flow meters.

Commercial building and residential home gas flow meters experience significantly lower volumes and pressures than gas transmission pipelines. For example, normal residential gas meter capacity is about 500 scfh (based upon 2" water column differential across the meter). Normal delivery pressure is about 7" water column (0.25 psi). Normal gas service piping from the main to the residential customer meter set is typically ½ inch or ¾ inch polyethylene. Commercial or industrial meters typically have higher flow requirements and pressures than residential. Flow requirements may be in a range of 600 scfh to over 100,000 scfh. Requirements for delivery pressure may vary from 7" water column (0.25 psi) to distribution pressure (40-60 psi). Regardless of the volume or pressure meter accuracy remains important and may erode over time.

Current verification systems use air to test the meters. The meters are typically found in close proximity to the building or home being supplied with natural gas and access to the meter requires entering the property on which the building or house is sited. The meter is taken off line and mounted in a test unit that blows air through the meter at about 10% of meter capacity. Testing may be accurate within a range of 1% to 1.5%. However, because natural gas is not flowed through the meter, the accuracy is for measuring air.

SUMMARY

Embodiments of a portable verification system for use in verifying commercial building and residential home gas flow meters includes a wheeled cart containing a piping circuit having a calibrated ultrasonic (master) meter and an air blower in fluid communication with the ultrasonic meter. The master meter may include a flow conditioner. Flexible hoses connect the inlet and outlet of the piping circuit to the commercial building or residential home gas flow meter (field meter) where it can be tested in situ using natural gas. The piping circuit includes valves for controlling flow through the piping circuit. An uninterruptable power supply (e.g. battery) and generator located on the wheeled cart provide required power. The generator may be a 2500 W generator for outdoor use.

BRIEF DESCRIPTION OF THE DRAWINGS

FIG. 2A is a front elevation view of a flexible stainless double wall hose used in connection with the piping circuit of FIG. 1 and having a lap joint flange at one end and a raised face weld neck flange at the other end.

FIG. 2B is a front elevation view of connection adaptor using in connection with the piping circuit of FIG. 1. Size may range from 1.5" ANSI 150 to 6" ANSI 150.

ELEMENTS AND NUMBERING USED IN THE DRAWINGS AND DETAILED DESCRIPTION

Figure 1:
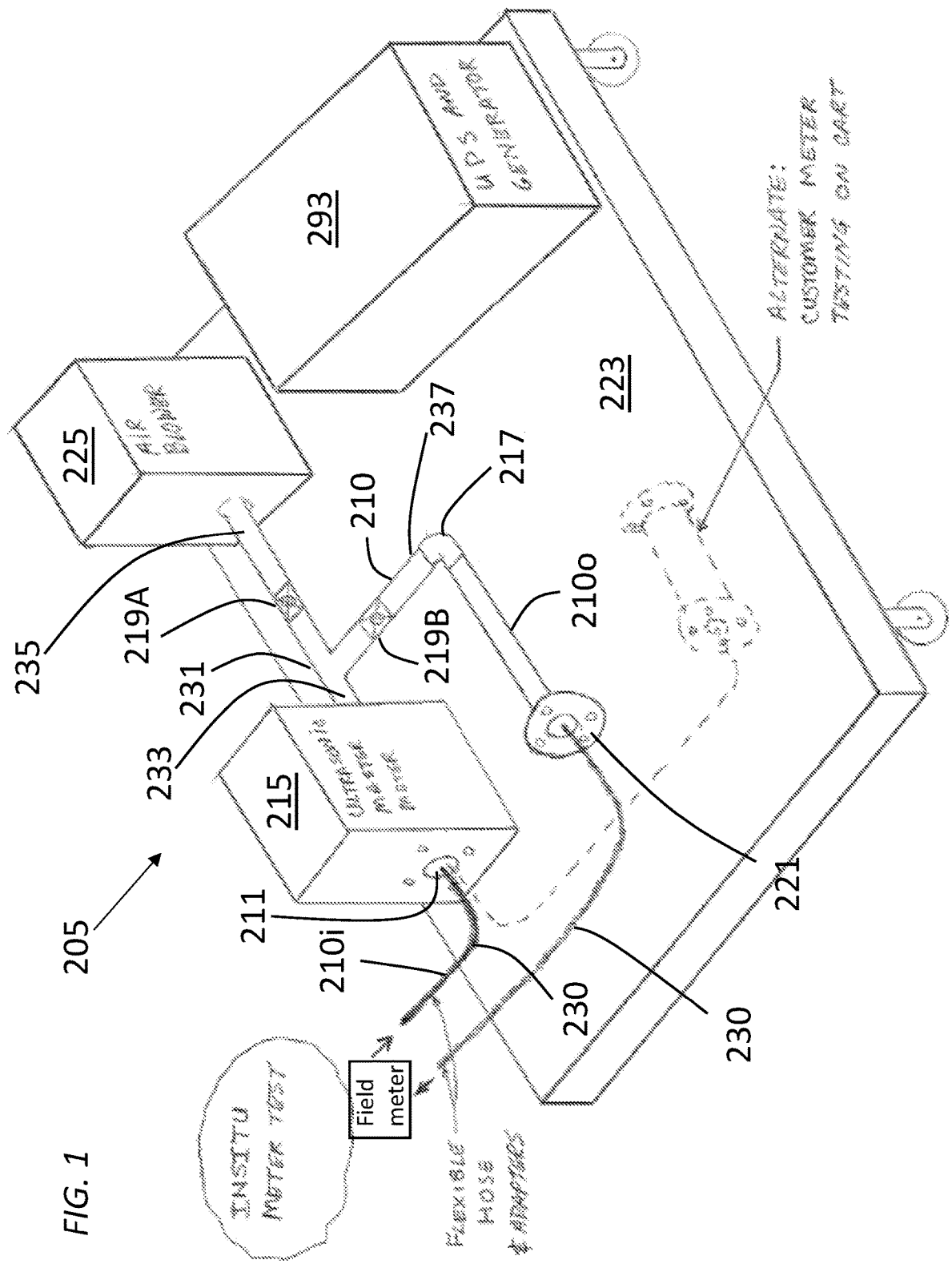
FIG. 1 is a schematic of an embodiment of a portable verification system for use in verifying commercial building and residential home gas meters. Natural gas flows through the field meter, into the portable verification system, and into the commercial building or residential home. In embodiments, the ultrasonic gas flow meter of the portable verification system may be one that includes both the meter and a volume corrector, such as a FLOWSIC500™ ultrasonic compact gas flow meter or its equivalent.

M In-field meter (meter under test)
205 Portable verification system or mobile reference meter system
210 Pipe or piping
210i Inlet piping
210o Outlet piping
211 Inlet end
215 Calibrated ultrasonic gas flow meter (reference or master meter)
217 Turn
219 Flow control valve
221 Outlet end
223 Measurement trailer or wheeled cart
225 Air blower
230 Flexible hose
231 Tee
233 First end
235 Second end
237 Third end
249 Lap joint flange
290 Adaptor
291 Flange
293 Battery power and generator

DETAILED DESCRIPTION

Referring now to FIGS. 1, 2A and 2B, a portable verification system 205 arranged for use in commercial or industrial building and residential home settings includes a wheeled cart 223 and, mounted on the wheeled cart 223:

a piping circuit 210 including an inlet end 211, an outlet end 221, and, between the inlet and outlet ends 211, 221, two flow control valves 219A and B and one tee 231;

an ultrasonic gas flow meter 215 located between the inlet end 211 of the piping circuit 210 and a first end 233 of the tee;

an air blower 225 located at a second end 235 of the tee 231; and a battery and a generator 293, the battery in circuit relation to the generator, the ultrasonic gas flow meter 215, and the air blower 225;

One valve 219A of the two flow control valves 219 is located between the first and second ends 233, 235 of the tee 231 and therefore between the ultrasonic gas flow meter 215 and the air blower 225. Another valve 219B of the two flow control valves 219 is located toward a third end 237 of the tee 231 and therefore toward the outlet end 221 of the piping circuit 210.

The piping circuit 210 further includes two flexible hoses 230. Each flexible hose 230 includes a flange 291 at one end and a lap joint flange 249 at another end, the flange 291 connected to a corresponding one of the inlet and outlet ends 211, 221 of the piping circuit 210. Note that in embodiments, the inlet end 211 may be a run of pipe similar to that shown on the outlet end 221 or flange 291 may mount directly to the ultrasonic gas flow meter 215.

When in an intended use, a same natural gas flow flows through the gas meter M connected to the commercial building or residential home and the portable verification system 205. In some embodiments, the natural gas first flows into the gas flow meter M of the building and then into the ultrasonic gas flow meter 215 of the portable verification system 205. In other embodiments, the natural gas first flows into the ultrasonic gas flow meter 215 of the portable verification system 205 and then into the gas flow meter M of the building.

Control valve 219A is in a closed position to prevent gas flow to the air blower 225. The natural gas then exits the outlet end 221 and enters the piping circuit of the building or home. The results of the field meter and reference meter 215 may then be compared.

In some embodiments, the field meter M may also be tested on the wheeled cart 223 with the reference meter 215 removed or bypassed. The air blower 225 may be used for the test with control valves 219A and 219B both open. The air blower 225 may be a centrifugal blower sized to test the field meter at a predetermined percentage of capacity. In some embodiments, the predetermined percentage is 10%, 10% to 20%, 20% to 30%, 30% to 40% and so on up to 90% to 100%.

In embodiments, the difference in the measured volumes can be reported. The measured volume of the gas flow meter may then be adjusted or corrected by the difference or by a bias factor or percentage based upon the difference.

The embodiments that have been described here provide illustrative examples. The disclosure extends to all functionally equivalent structures, methods, and uses that fall within the scope of the following claims.

What is claimed:

1. A portable verification system adapted for connection to a natural gas piping system of a building, the natural gas piping system including a gas flow meter, wherein in a connected state natural gas flows through the gas flow meter and the portable verification system, and then into the building, the portable verification system comprising:
    a wheeled cart and, mounted on the wheeled cart:
        a piping circuit including an inlet end having a flexible hose, an outlet end having a flexible hose, and, between the inlet and outlet ends, two flow control valves and one tee;
        an ultrasonic gas flow meter located between the inlet end of the piping circuit and a first end of the tee;
        an air blower located at a second end of the tee; and
        a battery and a generator, the battery in circuit relation to the generator, the ultrasonic gas flow meter, and the air blower;
    wherein, one of the two flow control valves is located between the first and second ends of the tee and therefore between the ultrasonic gas flow meter and the air blower, another one of the two flow control valves is located toward a third end of the tee and therefore toward the outlet end of the piping circuit and downstream of the air blower and the ultrasonic gas flow meter; and
    wherein in the connected state the one flow control valve is closed, thereby completely closing flow between the air blower and the ultrasonic gas flow meter, and the another flow control valve is opened, thereby permitting flow between the ultrasonic gas flow meter and the outlet end;
    each flexible hose including a flange at one end and a lap joint flange at another end, the flange connected to a corresponding one of the inlet and outlet ends of the piping circuit.

2. A method for verifying a gas flow meter arranged to measure use of natural gas when the gas flow meter is connected to a natural gas piping system of a building, the method comprising:
    shutting off a supply of the natural gas to the natural gas piping system;
    after the shutting off, connecting the portable verification system to the supply in order to place the portable verification system in flow relationship with the supply, the gas flow meter, and the natural gas piping system;
    after the connecting, turning on the natural gas supply; and
    after the turning on, flowing the natural gas into an ultrasonic gas flow meter of the portable verification system and the gas flow meter; and
    comparing a volume of the natural gas measured by the ultrasonic gas flow meter of the portable verification system and the natural gas as indicated by the gas flow meter;
    wherein the portable verification system includes:
        a wheeled cart and, mounted on the wheeled cart:
            a piping circuit including the inlet end having a flexible hose, the outlet end having a flexible hose, and, between the inlet and outlet ends, two flow control valves and one tee;
            an ultrasonic gas flow meter located between the inlet end of the piping circuit and a first end of the tee;
            an air blower located at a second end of the tee; and
            a battery and a generator, the battery in circuit relation to the generator, the ultrasonic gas flow meter, and the air blower;
        wherein, one of the two flow control valves is located between the first and second ends of the tee and therefore between the ultrasonic gas flow meter and the air blower, another of the two flow control valves is located toward a third end of the tee and therefore toward the outlet end of the piping circuit and downstream of the ultrasonic gas flow meter and the air blower;
        wherein, after the connecting and before the turning on, the one flow control valve is closed, thereby completely closing flow between the air blower and the ultrasonic gas flow meter, and the another flow control valve is opened, thereby permitting flow between the ultrasonic gas flow meter and the outlet end;
        each flexible hose including a flange at one end and a lap joint flange at another end, the flange connected to a corresponding one of the inlet and outlet ends of the piping circuit.

3. The method of claim 2, wherein, the flowing is first into the gas flow meter of the building and then into the ultrasonic gas flow meter of the portable verification system.

4. The method of claim 2, wherein, the flowing is first into the ultrasonic gas flow meter of the portable verification system and then into the gas flow meter of the building.

5. The method of claim 2, further comprising, after the comparing, reporting a difference in the volume of the natural gas measured by the ultrasonic gas flow meter of the portable verification system and by the gas flow meter of the building.

6. The method of claim 5, further comprising, adjusting a measured volume of the gas flow meter measured by the difference.

\* \* \* \* \*